United States Patent [19]

Vidwans et al.

[11] Patent Number: 4,988,134
[45] Date of Patent: Jan. 29, 1991

[54] INERTIA LATCHING MECHANISM WITH FLOATING STRIKER BAR

[75] Inventors: Mohan P. Vidwans, Saline; Susan H. Parkinson, Novi; Glenn Scott, Ann Arbor; Anthony J. Fecteau, Roseville, all of Mich.

[73] Assignee: Hoover Universal, Inc., Plymouth, Mich.

[21] Appl. No.: 518,482

[22] Filed: May 3, 1990

[51] Int. Cl.⁵ ............................................. E05C 1/10
[52] U.S. Cl. ................................. 292/198; 292/231; 292/DIG. 22; 297/379
[58] Field of Search ........... 292/198, 216, 195, 341.17, 292/341.18, 117, 213, 231, DIG. 22; 297/379

[56] References Cited

U.S. PATENT DOCUMENTS

| | | | |
|---|---|---|---|
| 2,699,568 | 1/1955 | Herscher | 292/341.17 X |
| 2,864,432 | 12/1958 | Limberg | 297/379 |
| 3,433,518 | 3/1969 | Foltz | 292/238 |
| 4,904,003 | 2/1990 | Yamayaki et al. | 297/379 X |
| 4,909,571 | 3/1990 | Widwons et al. | 297/379 |

Primary Examiner—Richard E. Moore
Attorney, Agent, or Firm—Harness, Dickey & Pierce

[57] ABSTRACT

An inertia sensitive latch mechanism for preventing a motor vehicle seat back from folding from a normal upright position to a folded forward position when the seat is exposed to deceleration loads above a predetermined level including a pendulum pivotally mounted to the movable seat back having a notch and tooth for engaging a striker bar. The center of gravity of the pendulum is located such that when the seat back is urged from the upright position to the folded position when the vehicle is exposed to a predetermined deceleration load, the pendulum engages the striker bar to prevent movement of the seat back. The striker bar is movably mounted to the seat support and the latch mechanism includes a guide member adjacent the pendulum for moving the striker bar to a predetermined location relative to the pivot point of the pendulum as the seat back is moved into its normal upright position.

16 Claims, 2 Drawing Sheets

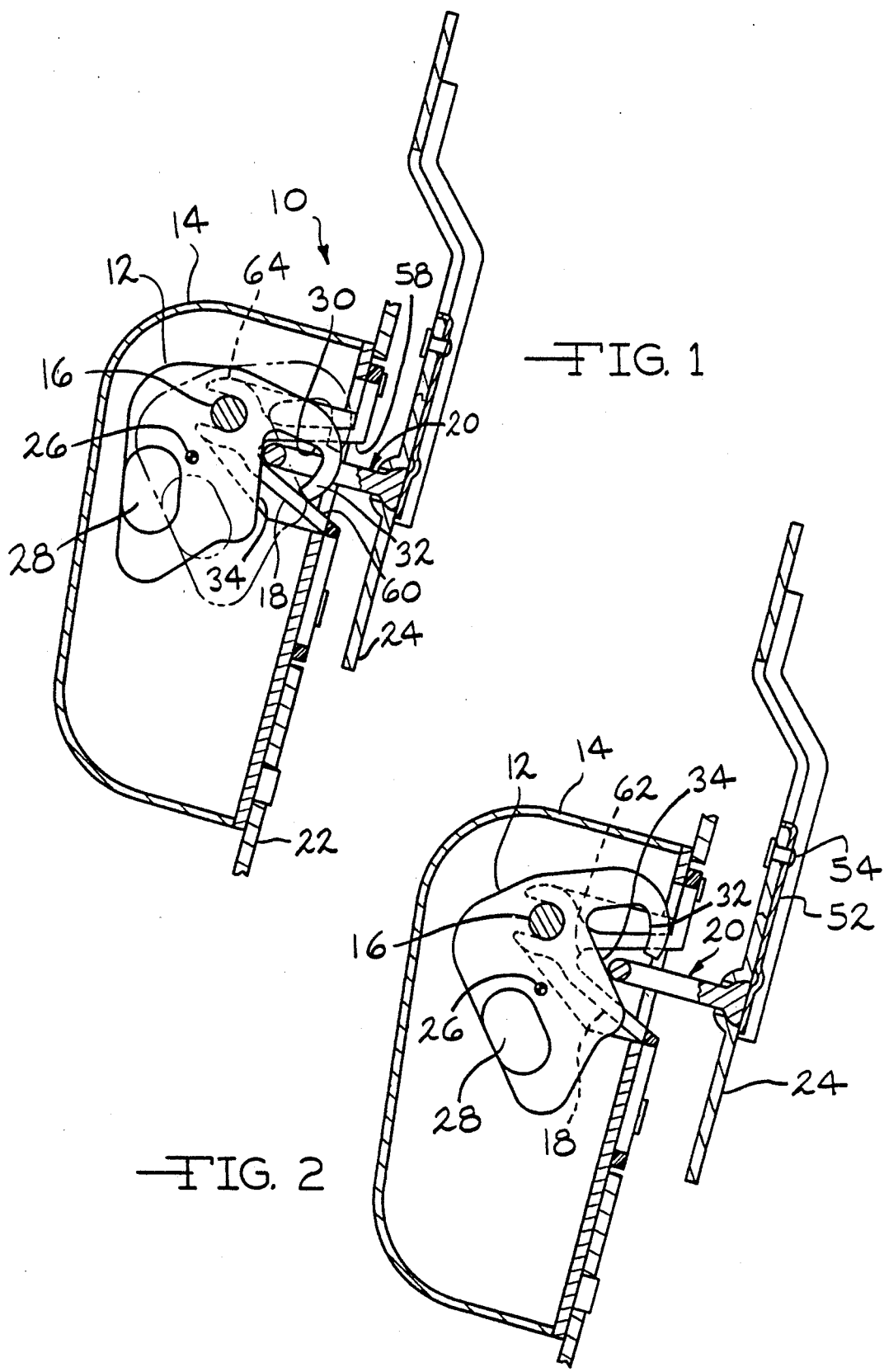

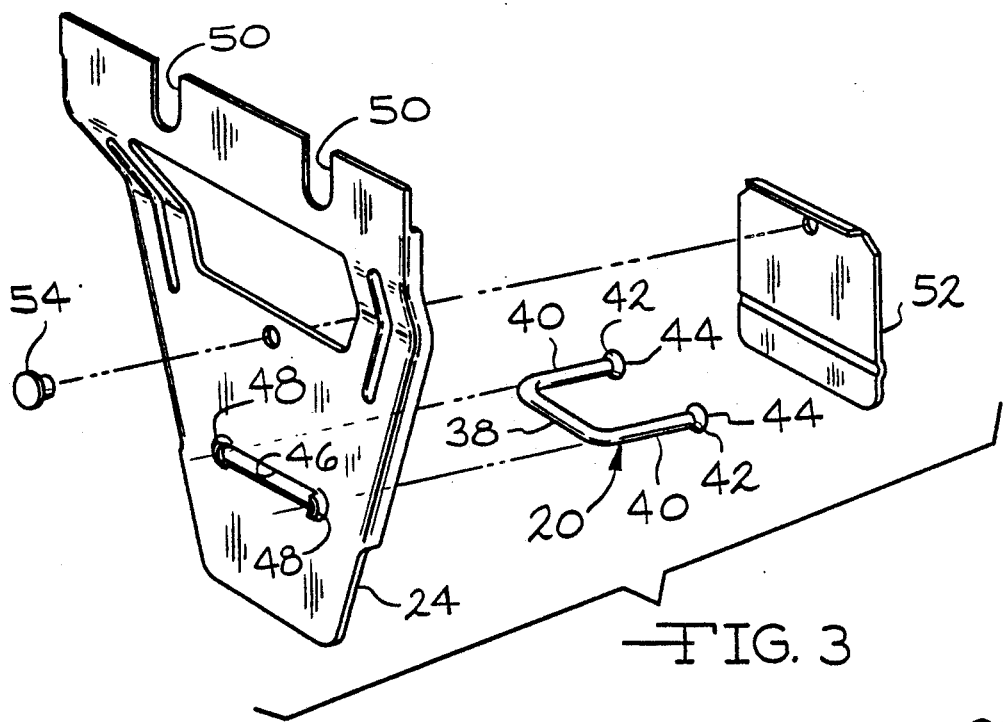
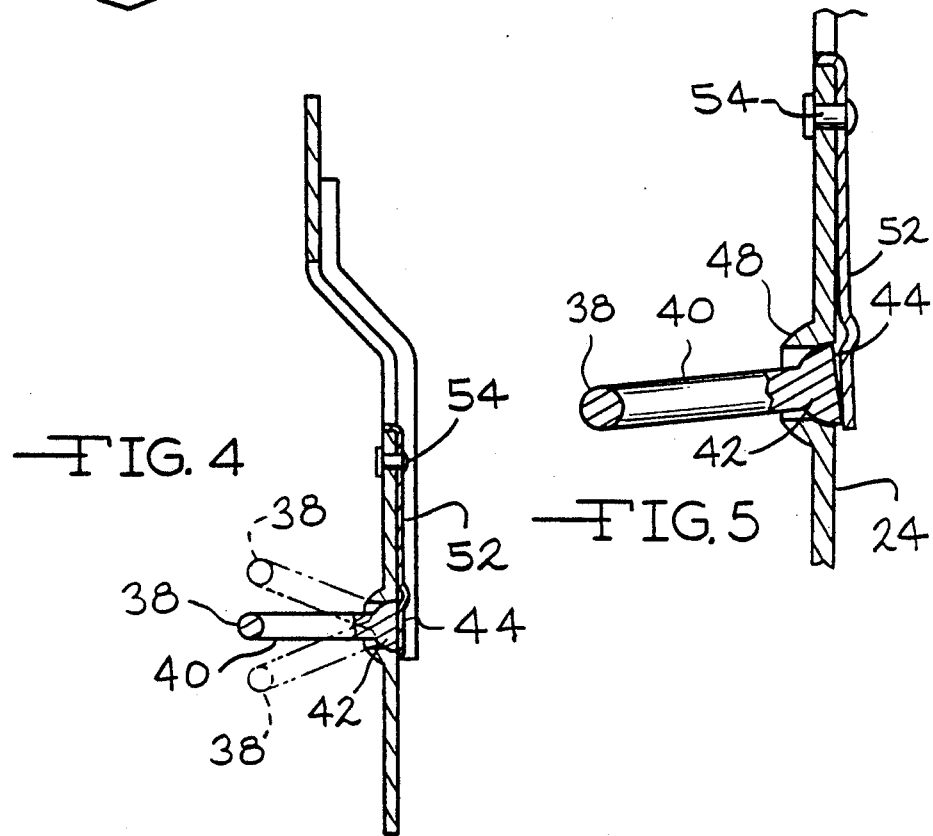

INERTIA LATCHING MECHANISM WITH FLOATING STRIKER BAR

BACKGROUND AND SUMMARY OF THE INVENTION

This invention relates to an inertia latching mechanism adapted for preventing forward folding of a motor vehicle seat back when the vehicle is exposed to a deceleration force above a predetermined level and, in particular, to a floating striker bar for the latching mechanism to ensure proper alignment of the striker bar with the pendulum latch hook.

As a safety feature, motor vehicle seat backs which have forward folding or "dumping" capability are provided with some means to prevent forward folding of the seat back when the vehicle is exposed to significant deceleration loads that occur, for example, in vehicle frontal impact conditions. Front vehicle seats in two-door vehicles generally can be folded forward to enable access to the rear compartment area. Similarly, some vehicles are equipped with a rear seat that can be folded forward to provide a larger load carrying area by expanding the space behind the rear seat. Manually released latching mechanisms can be used for such folding seats that require the user to actuate the mechanism before the seat back can be folded forward. Although these devices perform satisfactory, they are inconvenient to use. As a means of enhancing operator convenience, motor vehicle manufacturers frequently provide inertia sensitive latching mechanisms that normally enable the seat back to be freely dumped forward, but upon vehicle deceleration lock to prevent dumping of the seat back in vehicle impact conditions.

The inertia latching mechanism of the present invention has widespread potential application but is particularly suited for station wagons or similar vehicles to restrict forward folding of the seat back of a second passenger seat. The latching mechanism includes an inertia latch pendulum with a hook mounted to the seat back. When the seat back is in an upright position, the pendulum hook surrounds a striker bar attached to the seat support structure. In order to enhance the reliability of operation of the latch mechanism, the striker bar is mounted to the seat support in a manner enabling the striker bar to "float" to positively locate the striker bar relative to the pendulum hook. A guide member adjacent to the pendulum hook deflects the striker bar as necessary to position the striker bar at a predetermined location relative to the pivot point of the pendulum.

Further objects, features and advantages of the invention will become apparent from a consideration of the following description and the appended claims when taken in connection with the accompanying drawings.

BRIEF DESCRIPTION OF THE DRAWINGS

FIG. 1 is a sectional view of the inertial latching mechanism of this invention showing the pendulum in various positions.

FIG. 2 is a cross sectional view similar to FIG. 1 showing the initial motion of the seat back being folded forward when the vehicle is not subject to deceleration forces.

FIG. 3 is an exploded perspective view of the floating striker bar and mounting bracket.

FIG. 4 is a cross sectional view of the floating striker bar illustrating the range of motion of the striker bar.

FIG. 5 is an enlarged sectional view of the striker bar illustrating the bar in a deflected position.

DETAILED DESCRIPTION OF THE INVENTION

The inertia latching mechanism of the present invention having a floating striker bar is shown in FIGS. 1 and 2 and designated generally by 10. Latching mechanism 10 principally comprises a pendulum 12, cover 14, pivot post 16, guide member 18, mounting bracket 22 and a striker bar 20. The bracket 22 is mounted to the seat back rear panel, not shown. The striker bar 20 is carried by support bracket 24.

Pendulum 12 is rotatable about pivot post 16 which is strategically positioned above the pendulum's center of gravity designated by reference numeral 26. Pivot post 16 is carried for rotation by bracket 22 and provides a low friction bearing for swinging of the pendulum. Weighted section 28 is provided to produce the desired pendulum mass and center of gravity location and is formed integrally with the pendulum or may be a separately added component. A rear facing notch 30 is formed by the pendulum and defines an engagement tooth 32 with cam surface 34 leading into the notch. Bracket 22 includes an opening providing clearance for the striker bar 20 to pass through for engagement with pendulum 12. Striker bar 20 may be made in various configurations but is preferably a generally U-shaped hook fastened to bracket 24.

FIG. 1 shows the latch mechanism with the seat back in its upright position and capturing the striker bar 20. FIG. 2 shows the seat back in an intermediate position where the striker bar is first engaging the pendulum during raising the seat back or where the striker bar and pendulum disengage during lowering of the seat back. During raising of the seat, striker bar 20 initially engages cam surface 34 of the pendulum when the seat back is in the position shown in in FIG. 2. Continued rearward rotation of the seat back causes pendulum 12 to rotate in a clockwise direction to the full line position shown in FIG. 1. The phantom line position of the pendulum in FIG. 1 illustrates the extent of pendulum rotation. At the final or latched position, due to the configuration of notch 30 and cam surface 34, the pendulum 12 is rotated such that the tooth 32 is aligned with the striker bar and closes the opening into bracket 22 thereby capturing the striker bar.

Under normal operating circumstances, when a vehicle user wishes to fold the seat back forward, it may be simply grasped and folded forward without resistance. Such motion moves the seat back away from the support 24 as shown in FIG. 2 and, as the biasing of the pendulum caused by the interaction of the cam surface 34 with striker bar 20 is relieved, the position of the center of gravity 26 causes the pendulum to be rotated in a counter clockwise direction, thus enabling the striker bar 20 to escape engagement with tooth 32. If, however, the vehicle is subjected to deceleration loads above a predetermined level, a clockwise force is exerted on pendulum 12 due to the deceleration forces, maintaining alignment of the tooth 32 with striker bar 20 so that the tooth 32 engages the striker bar, thereby preventing unrestricted forward folding of the seat back.

In the preferred embodiment shown in the figures, the bracket 22 is recessed into the seat back so that when the seat back is in its forward folded position, the latching mechanism 10 is protected from damage and also provides a flat load floor area free of obstructions.

The mounting of the striker bar 20 to support 24 is shown in FIGS. 3 and 4. The striker bar 22 is generally U-shaped having a cross member 38 and two legs 40. Legs 40 terminate in generally hemispherical enlargements 42 having flat end surfaces 44.

Bracket 24 includes slots 50 for mounting the bracket to a stationary seat frame. Bracket 24 also includes a slot 46, the lateral ends of which form ball seats 48 for seating of the hemispherical enlargements 42 of the striker bar 20. Ball seats 48 are shaped as a portion of a hemisphere for engagement with the enlargements.

Striker bar 20 is held in place by a leaf spring 52, one end of which overlies the flat end surfaces 44 of the striker bar 20. The other end of the leaf spring is secured to bracket 24 by rivet 54.

The hemispherical enlargements and leaf spring enable the striker bar 20 to rotate a limited distance about the hemispherical enlargements. The zero rotation position of the striker bar is shown in solid line in FIG. 4 with rotation vertically in both directions shown in broken lines. Preferably, the extent of rotation is at least 21° in each direction from the zero rotation or center position. With the addition of appropriate guides, the striker bar 20 can be rotated somewhat in other directions besides vertically.

The interaction of the hemispherical enlargements and leaf spring is shown in FIG. 5, when the striker bar is rotated, the lower end of the leaf spring is deflected away from the support 24 by the corner of the flat end surfaces 44. The floating mount of the striker bar enables the cross member 38 of the striker bar to be positively located in relation to the pivot post 16 to ensure alignment with the pendulum tooth 32.

The guide member 18 in mounting bracket 22 provides a generally V-shaped recess into the bracket formed by ramp surfaces 58 and 60. The ramp surfaces of guide member 18 will act to rotate the striker bar either upwardly or downwardly to ensure that the cross member 38 is seated in the apex 62 of the guide member. This is accomplished by contact of the cross member with either ramp surface 58 or 60 while the seat back is being moved to its upright position. Guide member 18 includes a locating portion 64 that substantially surrounds the pivot post 16 to locate the guide member and hence apex 62 in a predetermined position relative to the pivot post 16. This ensures that when the cross member 38 is seated in the apex 62, it will be accurately positioned relative to the pendulum tooth 32 for proper functioning of the latch mechanism. Because the guide member 18 does not carry the latching load, it can be made of a polycarbonate or other appropriate plastic material. Likewise, the cover 14 can also be made of plastic.

It is to be understood that the invention is not limited to the exact construction or method illustrated and described above, but that various changes and modifications may be made without departing from the spirit and scope of the invention as defined in the following claims.

I claim:

1. An inertia sensitive latch mechanism for latching first and second bodies together, said second body being movable relative to the first body and having a position latched to said first body, comprising:
a striker bar carried by said first body;
a pendulum affixed to said second body and having a pivot means for enabling rotation of said pendulum, said pendulum having its center of gravity located at a predetermined position below said pivot means and defining a notch and tooth for engaging said bar, when the second body is in the latched position, said pendulum tooth being aligned with said striker bar in the direction of motion of said tooth relative to said striker bar so as to capture said striker bar, said pendulum interacting with said bar such that when the second body is not moved from said latched position when the second body is not exposed to deceleration loads, said pendulum tooth is rotated out of alignment with said bar, and when the second body is exposed to predetermined deceleration loads, said pendulum tooth remains aligned with said bar and engages said bar to prevent movement of the second body relative to the first body;
means mounting said bar to said first body for movement relative to said first body; and
means for guiding movement of said bar relative to said first body to a predetermined position relative to said pivot means as said second body is moved relative to said first body to said latched position.

2. The mechanism of claim 1 wherein said mounting means enables rotation of said striker bar relative to said first body about an axis generally parallel to the axis of rotation in said pivot means.

3. The mechanism of claim 2 wherein said rotation is in opposite directions from a centered position and further comprising bias means for returning said bar to said centered position when said bar is not engaging said guide means.

4. The mechanism of claim 1 wherein said guide means includes a V-shaped member mounted to said second body forming ramp surfaces engageable by said bar for guiding said bar to a predetermined location at the apex of said V-shaped member.

5. An inertia sensitive latch mechanism for preventing a motor vehicle seat back from folding from a normal upright position to a folded forward position when exposed to deceleration loads above a predetermined level comprising:
a striker bar carried by a stationary vehicle seat support;
a pendulum affixed to said seat back and having pivot means for enabling rotation of said pendulum, said pendulum having its center of gravity located at a predetermined position below said pivot means and defining a rearward-facing notch, a tooth for engaging said bar and a cam surface, said pendulum interacting with said bar such that as said seat back is moved from said folded position to said normal upright position, said bar contacts said cam surface and rotates said pendulum to a position of alignment with said bar to capture said bar with said tooth, and when said seat back is moved from said upright position toward said folded position when said vehicle is not exposed to said deceleration loads, said pendulum is rotated out of alignment with said bar, and when said seat back is urged from said upright position toward said folded position when said vehicle is exposed to said deceleration loads, said pendulum tooth engages said bar to prevent movement of said seat back;
means mounting said bar to said support for movement relative to said support; and means for guiding movement of said bar to a predetermined location relative to said pivot means as said seat back approaches said normal upright position.

6. The mechanism of claim 5 wherein said bar is U-shaped having two legs and a cross member, the legs having ends mounted to said support.

7. The mechanism of claim 5 wherein said guide means defines a generally V-shaped recess forming ramp surfaces for engagement by said striker bar for guiding said bar to said predetermined location at the apex of said V-shaped recess.

8. The mechanism of claim 5 further comprising bracket means disposed in said seat back for supporting said pendulum such that said pendulum is enclosed by said seat back and said striker bar passes through an aperture in said seat back to interact with said pendulum.

9. The mechanism of claim 5 wherein said mounting means enables rotation of said striker bar relative to said support at least about ±21° from a centered position.

10. The mechanism of claim 9 further comprising bias means for returning said striker bar to said centered position when said striker bar is not engaging said guide means.

11. The mechanism of claim 9 wherein said striker bar rotates about an axis generally parallel to said pivot means.

12. The mechanism of claim 6 wherein the ends of said bar form hemispherical enlargements having a flat end faces, said bar being mounted to said support by sandwiching said enlargements between said support and a leaf spring coupled to said support, said bar rotating about said hemispherical enlargements and deflecting said leaf spring when said bar is moved by said guide means.

13. The mechanism of claim 12 wherein said striker bar passes through a slot in said support so that said enlargements are positioned on the opposite side of said support from which said bar extends.

14. The mechanism of claim 13 wherein said slot ends form hemispherical segment shaped seats for said enlargements.

15. An inertia sensitive latch mechanism for preventing a motor vehicle seat back from folding from a normal upright position to a folded forward position when exposed to deceleration loads above a predetermined level comprising:

a generally U-shaped striker bar having a cross member and two legs, the ends of said legs forming hemispherical enlargements and terminating in flat end surfaces;

a stationary support member having a slot for the cross member of said striker bar to extend through with said enlargements on the opposite side of said support member from said cross member, said slot forming partially hemispherical seats for engagement with said enlargements;

a leaf spring member attached at one end to said support with a portion overlying and engaging said flat end surfaces to hold said enlargements in said seats, said spring member being resilient to enable rotation of said striker bar generally about said enlargements;

a pendulum affixed to said seat back and having pivot means for enabling rotation of said pendulum, said pendulum including means for engaging said cross member to prevent movement of said seat back from said upright position when said seat back is urged from said upright position when said vehicle is exposed to said deceleration loads; and means affixed to said seat back adjacent said pendulum for guiding rotation of said striker bar to a predetermined location relative to said pivot means as said seat back approaches said normal upright position.

16. The mechanism of claim 15 wherein said pendulum engaging means includes means for forming a rearward facing notch, a tooth for engaging said bar and a cam surface on said pendulum and means positioning the center of gravity of said pendulum below said pivot means, said pendulum interacting with said bar such that as said seat back is moved from said folded to said normal upright position, said cross member contacts said cam surface and rotates said pendulum to a position in which said tooth is aligned with said cross member, and when said seat back is moved from said upright position toward said folded position when said vehicle is not exposed to said deceleration loads, said pendulum is rotated out of alignment with said cross member, and when said back is urged from said upright position toward said folded position when said vehicle is exposed to said deceleration loads, said pendulum tooth engages said cross member to prevent movement of said seat back.

* * * * *

UNITED STATES PATENT AND TRADEMARK OFFICE
CERTIFICATE OF CORRECTION

PATENT NO. : 4,988,134

DATED : January 29, 1991

INVENTOR(S) : Mohan P. Vidwans, Susan H. Parkinson, Glenn Scott, Anthony J. Fecteau It is certified that error appears in the above-identified patent and that said Letters Patent is hereby corrected as shown below:

Column 4, line 11, Claim 1, after "is", kindly delete --not--.

Signed and Sealed this

Twenty-eighth Day of July, 1992

Attest:

DOUGLAS B. COMER

Attesting Officer    Acting Commissioner of Patents and Trademarks